US012374008B2

(12) United States Patent
Chongfuangprinya et al.

(10) Patent No.: US 12,374,008 B2
(45) Date of Patent: Jul. 29, 2025

(54) BEHIND-THE-METER DEVICES VISUALIZATION METHOD AND COMPUTING SYSTEM

(71) Applicant: Hitachi, Ltd., Tokyo (JP)

(72) Inventors: Panitarn Chongfuangprinya, San Jose, CA (US); Bo Yang, Santa Clara, CA (US); Yanzhu Ye, San Jose, CA (US); Masanori Abe, Santa Clara, CA (US); Anthony Hoang, Sunnyvale, CA (US); Natsuhiko Futamura, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 444 days.

(21) Appl. No.: 17/899,377

(22) Filed: Aug. 30, 2022

(65) Prior Publication Data

US 2024/0070945 A1   Feb. 29, 2024

(51) Int. Cl.
*G06T 11/60* (2006.01)
*G06T 11/20* (2006.01)

(52) U.S. Cl.
CPC ............ *G06T 11/60* (2013.01); *G06T 11/206* (2013.01)

(58) Field of Classification Search
None
See application file for complete search history.

(56) References Cited

U.S. PATENT DOCUMENTS

| 8,316,438 B1 * | 11/2012 | Bush | H04L 12/66 726/22 |
| 10,860,675 B2 * | 12/2020 | Ashby | G06F 16/958 |
| 2007/0282908 A1 * | 12/2007 | Van der Meulen | G06Q 10/06 |
| 2012/0323933 A1 | 12/2012 | He et al. | |
| 2020/0280771 A1 * | 9/2020 | Hoang | G01D 4/002 |
| 2022/0171690 A1 * | 6/2022 | Tougher | G06F 11/076 |

OTHER PUBLICATIONS

Tang, Yingying et al. "Modeling and validation of a distribution system with high PV penetration using zone division method". DOI 10.1109/TDC.2014.6863357, Corpus ID: 29921443. 12 pages.
Si, Yunpeng et al. "A High Performance Communication Architecture for a Smart Micro-Grid Testbed Using Customized Edge Intelligent Devices (EIDs) with SPI and Modbus TCP/IP Communication Protocols". DOI 10.1109/0 JPEL.2021.3051327, IEEE Open. Journal of Power Electronics. Retrieved: Aug. 30, 2022. 14 pages.
Tang, Yingying et al. "Modeling and validation of a distribution system with high PV penetration using zone division method". DOI 10.1109/TDC.2014.6863357, Corpus ID: 29921443. 12 pages, 2014.
Enelx. "DER Optimization Software Solar + Storage Fact Sheet". http://www.enelx.com/northamerica. Retrieved: Aug. 30, 2022. P20028 © Enel X North America, Inc. | All rights reserved. 7 pages.

* cited by examiner

*Primary Examiner* — Daniel F Hajnik
*Assistant Examiner* — Jed-Justin Imperial
(74) *Attorney, Agent, or Firm* — Procopio, Cory, Hargreaves & Savitch LLP

(57) ABSTRACT

A method for visualization of an end device. The method may include setting an object display limit on a display map, the display map displaying a plurality of objects, and wherein each of the plurality of objects is assigned a priority status; receiving data from the end device; classifying the data and assigning priority status to an object with the data, wherein the object is added to the plurality of objects; and displaying the plurality of objects based on priority status and the object display limit.

16 Claims, 11 Drawing Sheets

BEHIND-THE-METER DEVICES VISUALIZATION METHOD AND COMPUTING SYSTEM

BACKGROUND

Field

The present disclosure is generally directed to a method and a system for visualization of an end device, and more specifically, to a method of displaying objects based on priority status associated with the objects.

Related Art

Adoption of behind-the-meter Distributed Generation Resources (DERs) or behind-the-meter devices has risen significantly in recent years. Typically, inverters for the individual behind-the-meter DERs operate independently without communicating directly with nearby DERs and utilities. Thus, utilities need to limit capacity of DERs in a conservative way to limit potential impacts to safety and reliability. Without end-to-end communication and control, utilities are facing challenges in operation due to lacking insight and control of behind-the-meter DERs.

In the related art, an optimization software is used in managing DERs. The software utilizes aggregation of resources and provides asset analytics. However, the software lacks visualization of objects and user-screen interaction associated with status prioritization of behind-the-meter devices.

In the related art, a priority score is calculated for notification based on priority values associated with the related user data items. Notification is displayed among other notifications based on calculated priority score relative to the priority scores of the other notifications. However, this relates to notification prioritization on a mobile device and is unrelated to distribution operation, and hence, does not provide improved performance of displaying distribution system with large number of objects.

SUMMARY

Aspects of the present disclosure involve an innovative method for visualization of an end device. The method may include setting an object display limit on a display map, the display map displaying a plurality of objects, and wherein each of the plurality of objects is assigned a priority status; receiving data from the end device; classifying the data and assigning priority status to an object with the data, wherein the object is added to the plurality of objects; and displaying the plurality of objects based on priority status and the object display limit.

Aspects of the present disclosure involve an innovative non-transitory computer readable medium, storing instructions for visualization of an end device. The instructions may include setting an object display limit on a display map, the display map displaying a plurality of objects, and wherein each of the plurality of objects is assigned a priority status; receiving data from the end device; classifying the data and assigning priority status to an object with the data, wherein the object is added to the plurality of objects; and displaying the plurality of objects based on priority status and the object display limit.

Aspects of the present disclosure involve an innovative server system for visualization of an end device. The server system may include setting an object display limit on a display map, the display map displaying a plurality of objects, and wherein each of the plurality of objects is assigned a priority status; receiving data from the end device; classifying the data and assigning priority status to an object with the data, wherein the object is added to the plurality of objects; and displaying the plurality of objects based on priority status and the object display limit.

Aspects of the present disclosure involve an innovative system for visualization of an end device. The system can include means for setting an object display limit on a display map, the display map displaying a plurality of objects, and wherein each of the plurality of objects is assigned a priority status; means for receiving data from the end device; means for classifying the data and assigning priority status to an object with the data, wherein the object is added to the plurality of objects; and means for displaying the plurality of objects based on priority status and the object display limit.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION

Figure 1:
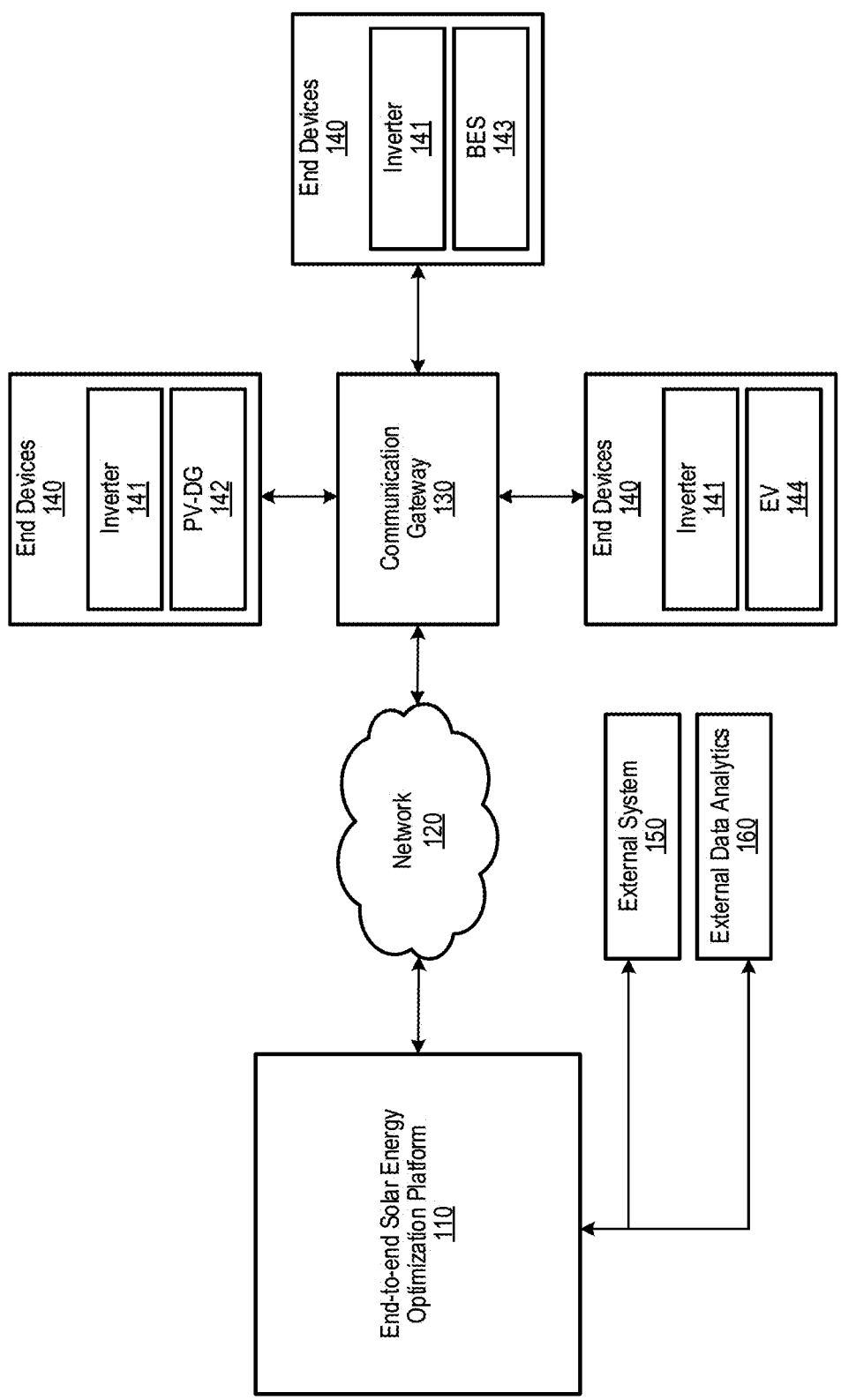
FIG. 1 illustrates an example optimization system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

Example implementations described herein are directed to behind-the-meter devices visualization method and computing system that improve the performance and optimize user experience during real-time operation through visualization and prioritization of both condition and status of behind-the-meter devices, as well as the distribution grid. The example implementations described herein can assist grid operators with improved situational awareness and support their decision making.

FIG. 1 illustrates an example optimization system, in accordance with an example implementation. In the example optimization system, there is end-to-end solar energy optimization platform 110, network 120, communication gateway 130, and a plurality of end devices (behind-the-meter-devices) 140. The end-to-end solar energy optimization platform 110 may send, receive, store, and process field data from the end devices 140 through network 120 and the communication gateway 130. The end-to-end solar energy optimization platform 110 may be hosted on a local server or on the cloud. Network 120 can be any network or combination of networks (e.g., the Internet, local area network, wide area network, a telephonic network, a cellular network, satellite network, and the like).

Communication gateway 130 facilitates data communication between the network 120 and the end devices 140. The end devices 140 may include inverter 141 and one or more of a Photovoltaic Distributed Generation (PV-DG) 142, a Battery Energy Storage (BES) 143, and an Electric Vehicle (EV) 144. Data generated by the end devices 140 may include voltage, current, power generated, etc.

Data may be exchanged between the end-to-end solar energy optimization platform 110 and external system 150. The external system 150 may include Outage Management System (OMS), Advanced Distribution Management System (ADMS), Distributed Energy Resource Management System (DERMS). Data may also be exchanged between the end-to-end solar energy optimization platform 110 and external data analytics 160. The external data analytics 160 may include DHCA (Dynamic Hosting Capacity Analysis), CBA (Cost Benefit Analysis), etc. Processed data at external data analytics 160 may provide actionable insight for real-time operation.

Figure 2:
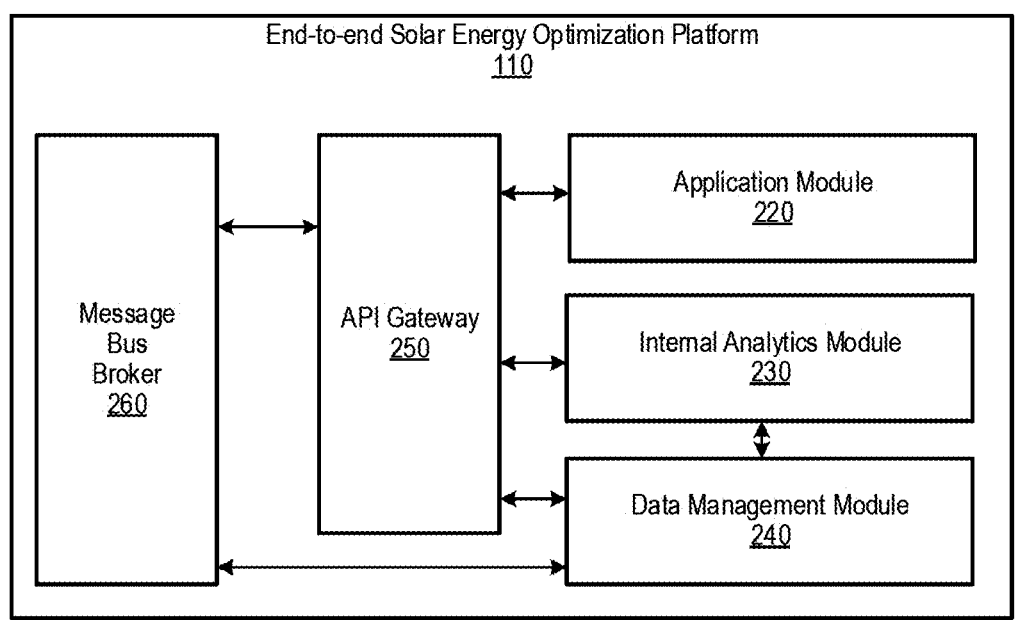
FIG. 2 illustrates an example end-to-end solar energy optimization platform, in accordance with an example implementation.

FIG. 2 illustrates an example end-to-end solar energy optimization platform 110, in accordance with an example implementation. As illustrated in FIG. 2, the end-to-end solar energy optimization platform 110 may include an application module 220, an internal analytics module 230, a data management module 240, Application Programming Interface (API) gateway 250, and a message bus broker 260. Application module 220 is a user interface with the primary function of real-time operation status display of the end devices 140. Internal analytics module 230 provides operation insight and control of the end devices 140. The internal analytics module 230 may include behind-the-meter devices visualization method, DHCA, etc. While the internal analytics module 230 and the external data analytics 160 may perform the same function, different algorithms may be utilized to yield different performance measurements and results.

The data management module 240 includes one or more databases for storing data. In some example implementations, the data management module 240 may include different databases for storing different types of data. Example database may include a relational database management system (RDBMS) such as PostgreSQL, and graph database (GDB) such as Neo4j. Example data types include feeder object data, data from end devices, data from external system, and processed data from internal or external analytics.

Feeder object data contain any data related to feeder objects. A subset of the feeder object data is utilized by the distribution feeder model. The distribution feeder model may include data related to physical attribute and connection of the distribution system. For example, such data may include overhead conduction, coordinate location, etc. The feeder model may also include data on communication gateway 130 and end devices 140. For example, such data may include, but not limited to coordinate location, name of the gateway, gateway connection information, name of end device, type of end device, etc.

Data from end devices 140 may be static data or time-series data. Examples of static data may include nameplate, specification data, etc. Examples of time-series data may include voltage, current, active power, reactive power, etc. Processed data are data generated from the internal analytics module 230 or external data analytics 160. Processed data may provide actionable insight for real-time operation.

The API gateway 250 is included in the end-to-end solar energy optimization platform 110 to provide APIs for application layer to allow data to be sent and received through the API gateway 250.

The message bus broker 260 exchanges data between communication gateway 130 and the end-to-end solar energy optimization platform 110. In some example implementations, the message bus broker is MQTT protocol. The message bus broker 260 provides data ingestion service to which MQTT publishers on communication gateway 130 may publish the data to the end-to-end solar energy optimization platform 110. The data stored in the message bus broker 260 may represent one or more computer files having a variety of data formats and types of data, including text data, binary data, comma-separated values (CSV), extensible markup language (XML), and JavaScript Object Notation (JSON).

Message bus broker 260 may also send command message via data pusher to end devices 140 through the communication gateway 130. Example command messages include, but not limited to, check-alive command to request a response message from an end device 140, command to change inverter operation mode, etc. Message bus broker 260 may contain security layers such as, but not limited to, authentication using username and password, data encryption through TLS/SSL, etc.

Figure 3:
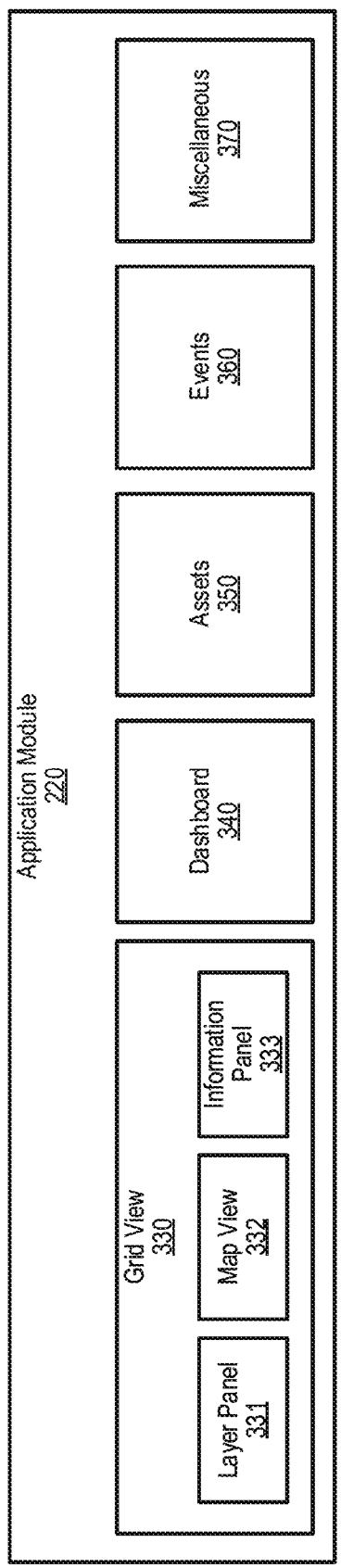
FIG. 3 illustrates an example application module of the end-to-end solar energy optimization platform, in accordance with an example implementation.

FIG. 3 illustrates an example application module 220 of the end-to-end solar energy optimization platform 110, in accordance with an example implementation. Application module 220 is a user interface with the primary function of real-time operation status display of the end devices 140. As illustrated in FIG. 3, the application module 220 may include a grid view 330, a dashboard 340, assets 350, events 360, and miscellaneous 370. Application module 220 performs aggregation of solar inverter operational insights for access by grid operators, and allows operators or utility enterprise systems to command and control solar inverters. In addition, the application module 220 provides asset health information and notifications to operations and maintenance teams to ensure timely mitigation of abnormal conditions and reliable control.

Figure 4:
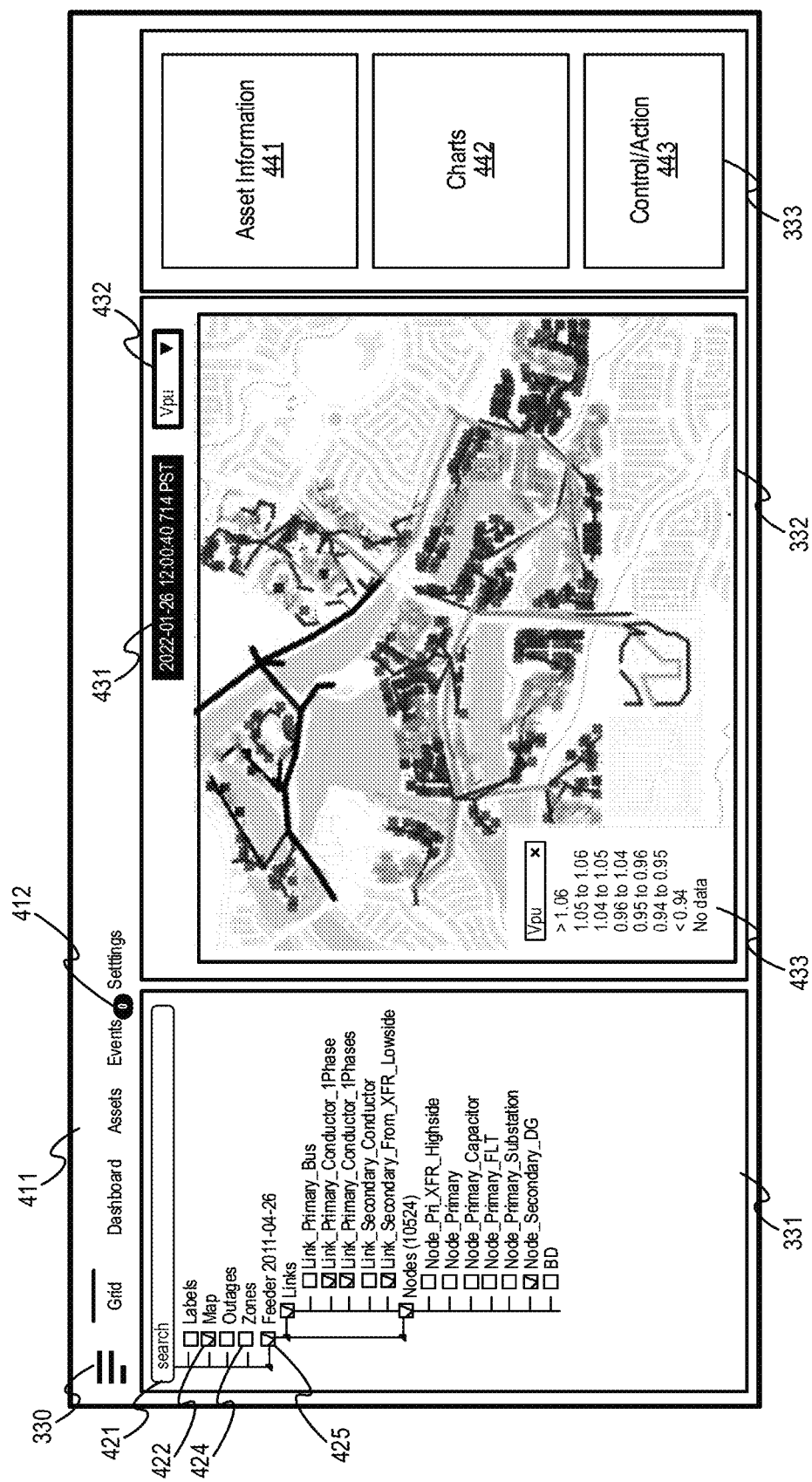
FIG. 4 illustrates an example display of the grid view, in accordance with an example implementation.

FIG. 4 illustrates an example display of the grid view 330, in accordance with an example implementation. As illustrated in FIGS. 3 and 4, the grid view 330 comprises layer panel 331, map view 332, and information panel 333. Layer panel 331 allows a user to select object layer for display on map view 332. Layer panel 331 may involve object layers such as, but not limited to, map 422, zone 424, and feeder model 425, or any other types of selectable layer suitable for display formulation. End devices 140 may be included as part of the feeder model 425. Layer panel 331 may include additional functions such as search function 421, which allows a user to navigate and search for a desired object layer. The grid view 330 may also include tabular pages 411 that allow a user to control viewing options and function selection. Specifically, tabular pages 411 correspond to dashboard 340, assets 350, events 360, and miscellaneous 370 of FIG. 3. Key performance indicators (KPIs), and summary or overviews associated with a page of tabular pages 411 can be accessed once the page is opened. The grid view 330 may also include a warning indicator 412 that indicates number of events requiring user's attention and may be accessed by tab selection.

Map view 332 provides visualization for a user to view real-time operation information. Map view 332 may include a clock 431, data selection 432, and legend 433. A user may use data selection 432 to select certain information for visualization on map view 332, such information may involve, but not limited to, voltage level, active power flow, reactive power flow, etc. Legend 433 reflects value range of selected information and corresponding color palette. For example, the color yellow may be used to indicate voltage value between 1.04 and 1.05 Vpu.

Information panel 333 may display additional information of a selected object. The selected object may be an end device 140. The additional information may include asset information 441, charts 442, and control/action 443. Asset information 441 may include detailed information surrounding an end device 140 and is updated from the field every 30 seconds. Charts 442 may include graphical representation of the detailed information surrounding the selected end device 140. Control/action 443 may include display of operation control/action of the selected end device 140. In some example implementations, recommended operation control/action may be generated and displayed for selection based on the detailed information surrounding the selected end device 140.

Figure 5:
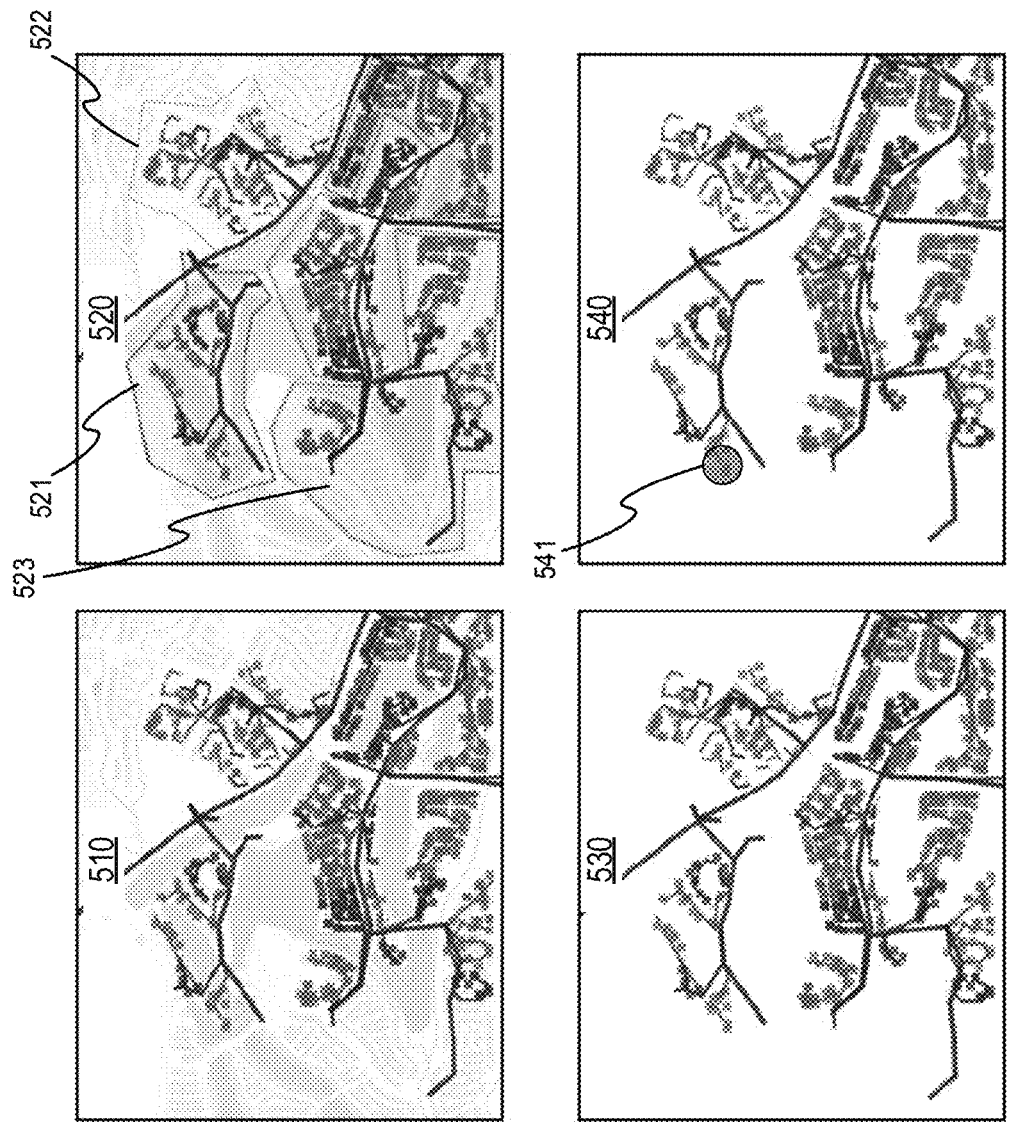
FIG. 5 illustrates example map view displays under different selected layers.

FIG. 5 illustrates example map view displays under different selected layers. As illustrated in FIG. 5, display 510 shows a map view display with feeder object layer and street map layer selected. Display 520 shows a map view display with feeder object layer, street map layer, and operation zone of end devices layer selected. Zones 521, 522, and 523 of display 520 are the result of selecting operation zone of end devices layer.

Display 530 shows a map view display with only the feeder object layer selected for display. Display 540 shows a map view display with feeder object layer and event maker layer selected. As illustrated in display 540, marker 541 identifies location of an event requiring user's attention. Example events may involve, but not limited to, power outage location, communication outage location, etc.

Figure 6:
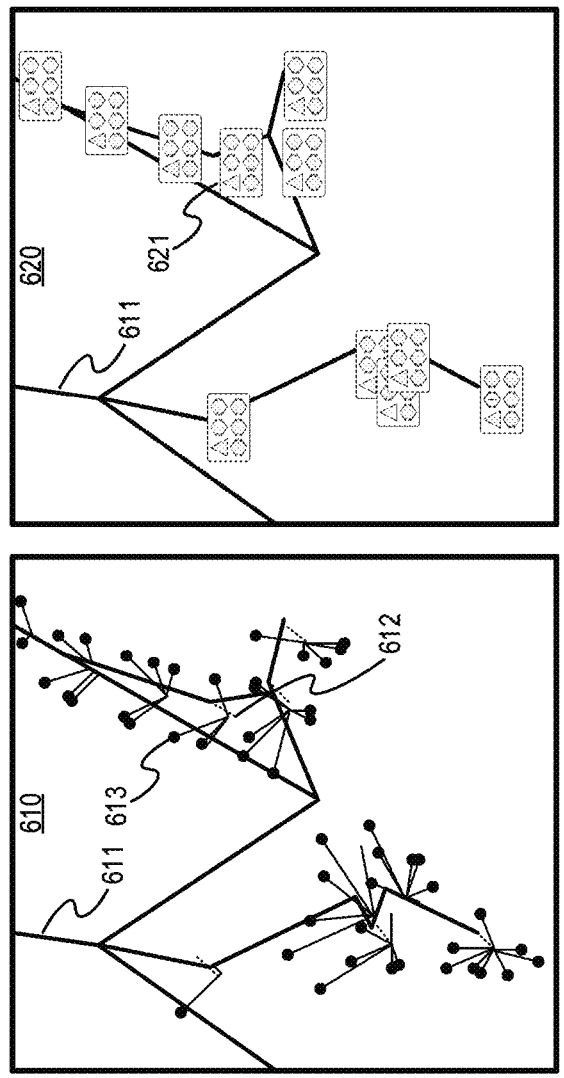
FIG. 6 illustrates example visualizations of feeder object with communication gateways and end devices in map view, in accordance with an example implementation.

FIG. 6 illustrates example visualizations of feeder object with communication gateways 130 and end devices 140 in map view 332, in accordance with an example implementation. Display 610 displays a feeder object at location 611, a communication gateway 130 at location 612, and an end device 140 at location 613. Display 620 displays an alternative view of display 610. Display 620 displays communication gateway 130 and end devices 140 within a single enclosure 621. As illustrated, display 620 helps a user to group multiple end devices 140 that communicate through a single communication gateway 130 together. In addition, the alternative view facilitates a user to identify different statuses associated with the communication gateway 130 and end devices 140.

Figure 7:
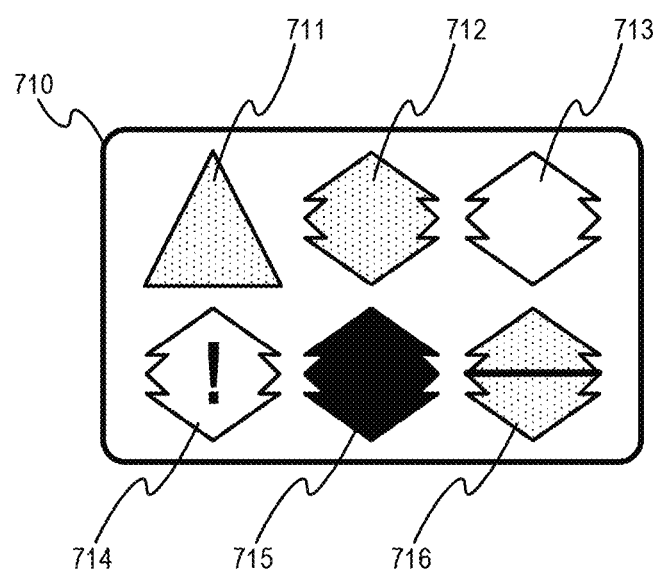
FIG. 7 illustrates example symbols and statuses of communication gateway and end devices in association with an enclosure, in accordance with an example implementation.

FIG. 7 illustrates example symbols and statuses of communication gateway 130 and end devices 140 in association with an enclosure, in accordance with an example implementation. Symbol 710 represents an enclosure associated with a single communication gateway 130 and five end devices 140 with different statuses. As illustrated, FIG. 7 shows that five end devices 140 are communicated through a single communication gateway 130.

Symbol 711 is an example symbol of a communication gateway 130 showing an online status. Symbol 712 is an example symbol of an end device with an online status. Symbol 713 is an example symbol of an end device 140 providing ancillary services to support a distribution system while having online status. For example, upon receiving a command from the end-to-end solar energy optimization platform 110, operation mode of an end device 140 may be changed to non-unity power factor mode to regulate voltage level on distribution feeder within operation limits of 0.95-1.05 Vpu.

Symbol 714 represents an end device 140 with a warning indicator. This notifies a user to check the status of the associated end device 140. Symbol 715 represents an end device 140 with offline status, which is not in communication with the end-to-end solar energy optimization platform 110. Symbol 716 represents an end device 140 with online status. However, due to physical limitation of the end device 140, the end-to-end solar energy optimization platform 110 is unable to send control command to change the operation mode of the end device 140.

Figure 8:
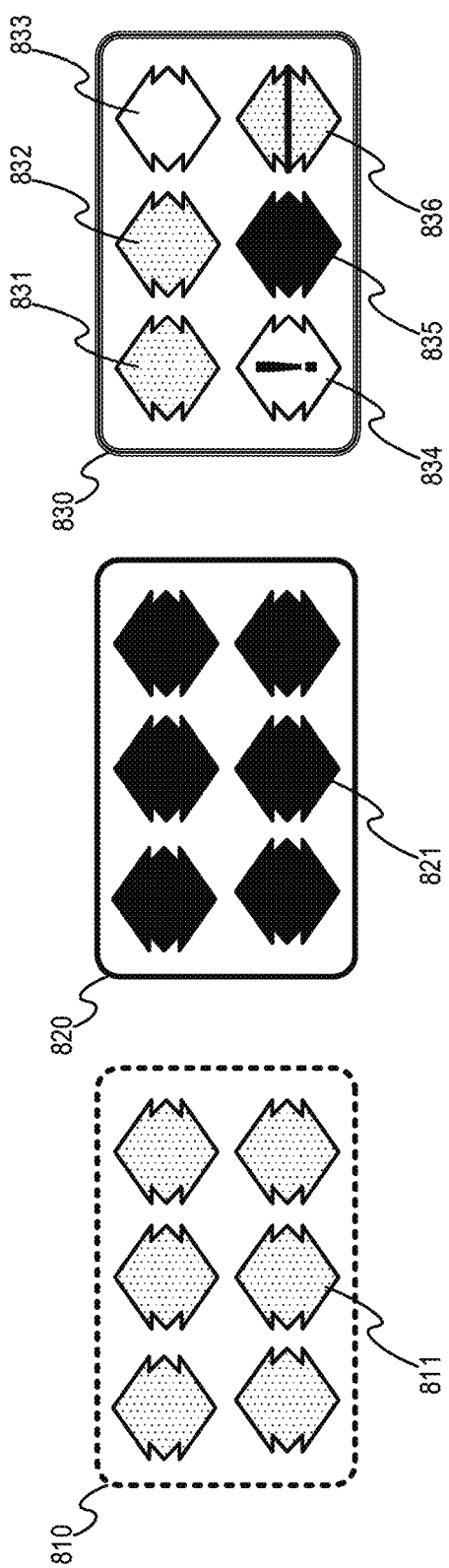
FIG. 8 illustrates alternative views of symbols and statuses of communication gateway and end devices in association with an enclosure, in accordance with an example implementation.

FIG. 8 illustrates alternative views of symbols and statuses of communication gateway 130 and end devices 140 in association with an enclosure, in accordance with an example implementation. Symbol 810 represents a communication gateway with online status. Symbols 811 show six end devices 140 with online status that are communicating with the end-to-end solar energy optimization platform 110 through the communication gateway 130.

Symbol 820 represents a communication gateway 130 with offline status. Symbols 821 represent six end devices 140 with offline status, and are not in communication with the end-to-end solar energy optimization platform 110 through the communication gateway 130.

Symbol 830 represents a communication gateway 130 with warning status. Symbol 834 represents an end device 140 with warning status that causes the symbol 830 to be displayed with warning status. Symbols 831 and 832 represent end devices 140 with online status. Symbol 833 represents an end device 140 with online status and provides ancillary services to support distribution system. Symbol 835 represents an end device 140 with offline status and not in communication with the end-to-end solar energy optimization platform 110 through the communication gateway 130. Symbol 836 represents an end device 140 with online status. However, due to physical limitation of the end device 140, the end-to-end solar energy optimization platform 110 is unable to send control command to change the operation mode of the end device 140.

Figure 9:
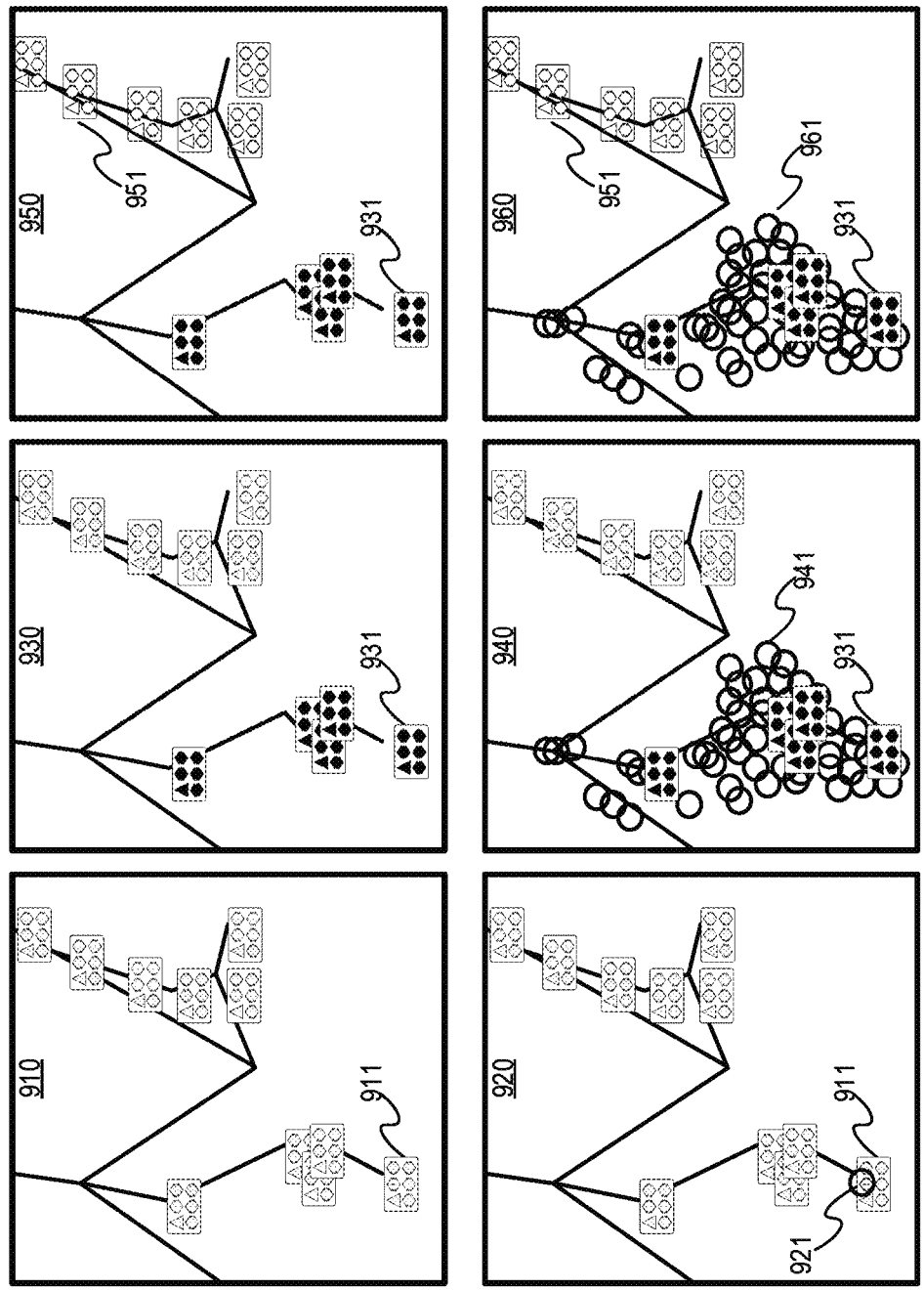
FIG. 9 illustrates example map view scenarios, in accordance with an example implementation.

FIG. 9 illustrates example map view scenarios, in accordance with an example implementation. Scenario 910 shows a map view 332 with a single end device with warning status at location 911. A user can identify the warning and take actions to address any issue by first checking details of the end device 140. Scenario 920 is similar to scenario 910 but with an additional event marker 921 that captures the end device 140 with the warning status with a circular identifier.

Scenario 930 shows a map view 332 with five communication gateways 130 in offline status at location 931. End devices 140 that communicate through the corresponding offline communication gateways 130 are also in offline status. The remaining of communication gateways 130 and end devices 140 on the screen are shown with online status. Scenario 940 is similar to scenario 930 but with additional event markers 941 at various locations identifying the end devices with warning status.

Scenario 950 shows a map view 332 with five communication gateways 130 in offline status at location 931. End devices 140 that communicate through the corresponding offline communication gateways 130 are also in offline status. However, at location 951, six communication gateways 130 and corresponding end devices 140 are providing ancillary services to support the distribution system. Scenario 960 is similar to scenario 950 but with additional event markers 961 at various locations identifying the end devices with warning status.

The additional event marker layer in scenarios 920, 940, and 960 helps to identify location and occurrence of an event, and allows faster response in comparison to the corresponding counterpart without event marker.

Figure 10:
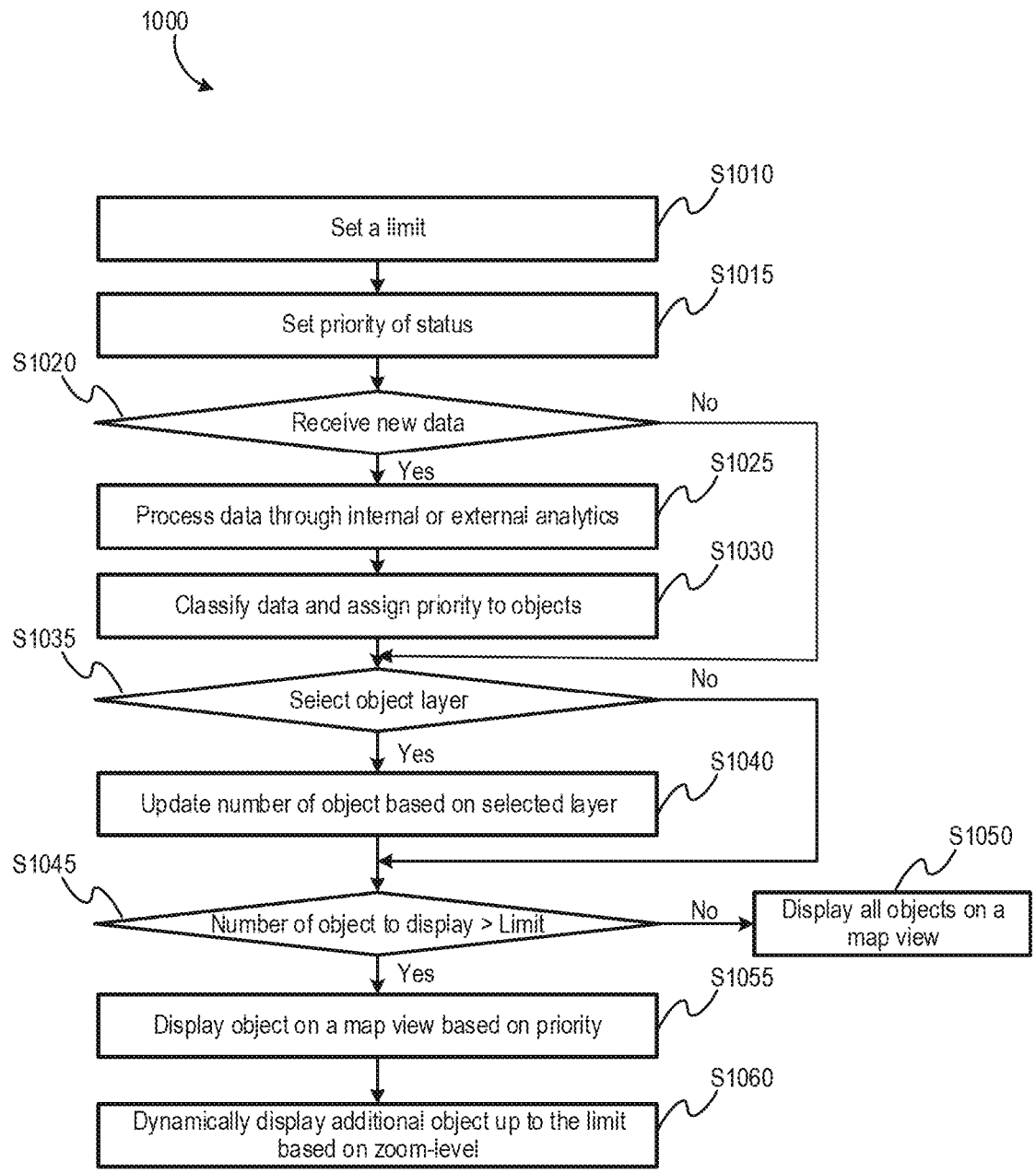
FIG. 10 illustrates an example flow diagram of a method for visualizing a behind-the-meter device/end device, in accordance with an example implementation.

FIG. 10 illustrates an example flow diagram of a method 1000 for visualizing a behind-the-meter device/end device, in accordance with an example implementation. The method begins at S1010, where a limit is set on number of objects to be displayed. Specifically, this limits the number of objects of the feeder model and other objects such as marker, to be displayed on map view of the system while prioritizing situation awareness to a user. A computing system has limited resources, and a user may suffer performance problem when all objects are displaying on the screen. The system will respond more rapidly with limited number of objects being displayed. A user can pay more attention to objects having higher priorities and provide actions to address issues at hand. For example, a user may set 3000 as the limit for objects to be displayed on a map view.

At S1015, priority of status is assigned to the objects. Objects may include all objects that will be displayed on map view such as, but not limited to, feeder objects, end device objects, event maker objects, etc. Objects with irregular status will be assigned with higher priority, while objects with normal status will be assigned with lower priority.

As an example, feeder objects may be classified by data or processed data from the field. Example classifications may include, but not limited to, loss of power, outage, warning, overvoltage, low voltage, within limit, reverse power, no data, normal, etc. The different classifications may be assigned with different levels of priority. For example, loss of power or outage may be assigned with a priority level of one, warning may be assigned with a priority level of two, over voltage may be assigned with a priority level of three, low voltage may be assigned with a priority level of three, within limit may be assigned with a priority level of five, reverse power may be assigned with a priority level of four, no data may be assigned with a priority level of five, and normal may be assigned with a priority level of five. The lower the priority level, the higher the priority. In some example implementations, priority statuses associated with the feeder objects may be determined by a user or a grid operator.

Communication gateways 130 and end devices 140 may be classified by status. Example status classifications may include, but not limited to, loss of power, outage, warning, providing support, offline, online, uncontrollable, normal, etc. The different statuses may be assigned with different levels of priority. For example, loss of power or outage may be assigned with a priority level of one, warning may be assigned with a priority level of two, providing support may be assigned with a priority level of three, offline status may be assigned with a priority level of four, online status may be assigned with a priority level of five, uncontrollable may be assigned with a priority level of five, and normal may be assigned with a priority level of five. The lower the priority level, the higher the priority. In some example implementations, priority statuses associated with the communication gateways 130 and end devices 140 may be determined by a user or a grid operator.

Similarly, event marker objects may be classified by type. Example object types may include, but not limited to, outage, warning, normal, etc. The different object types may be assigned with different levels of priority. For example, outage may be assigned with a priority level of one, warning may be assigned with a priority level of one, and normal may be assigned with a priority level of five. The lower the priority level, the higher the priority. In some example implementations, priority statuses associated with the event market objects may be determined by a user or a grid operator.

S1015 may include classification model building to predict priority for new data. Example classification algorithms include, but not limited to, decision tree, K-nearest neighbor, Support Vector Machines (SVM), etc. The classification model may be trained with historical data and associated assigned priority.

At S1020, a determination is made as to whether new data is received. The new data involves at least one of: data of end device, data of feeder object, or data of external system. The new data may be updated at predetermined time intervals such as, but not limited to, every 30 seconds or every 10 minutes. In some example implementations, the predetermined time interval may be adjusted based on user preference.

If new data is not received, then the process continues directly to S1035. If new data is received, then the process proceeds to S1025, the new data is then processed through internal or external analytics to generate processed data that provide additional insight or action such as dynamic hosting capacity or operation change of solar inverter. At S1030, the new data and the processed data are classified, and priority is assigned to each object associated with the new data and the processed data.

At S1035, the user decides whether object layer selection is to be made. If no object layer is selected, then the process continues directly to S1045. If object layer selection is made, then at least one object layer is selected from the layer panel. Selection of object layer will update the number of objects based on the selected object layer in S1040.

At S1045, a determination is made as to whether the total number of objects to display is higher than a limit/threshold. If the total number of objects to display is higher than the limit/threshold, then the process proceeds to S1055, where objects are displayed on a map view based on assigned priority. Objects having higher priority will be displayed first. If the total number of objects to display is equal to or less than the limit/threshold, then the process proceeds to S1050, where all objects are displayed on the map view.

In some example implementations, the method 1000 may also include S1060, which allows for dynamically displaying additional object up to the limit based on zoom-level. For example, number of objects to display is higher than the limit and not all objects are displayed from the zoom-out level. When a user zooms into to a certain area, method 1000 may dynamically display lower priority objects within the zoomed-in area.

The foregoing example implementation may have various benefits and advantages. For example, improving performance of the application layer by limiting number of objects to be displayed on map view. Optimal user experience is provided during real-time operation by visualization of condition and status of behind-the-meter devices and distribution grid. By displaying object and corresponding status based on priority, a user or grid operator can pay more attention to higher priority object and reduce user response time to real-time event. In addition, situational awareness is improved and further supports grid operators in decision making.

Figure 11:
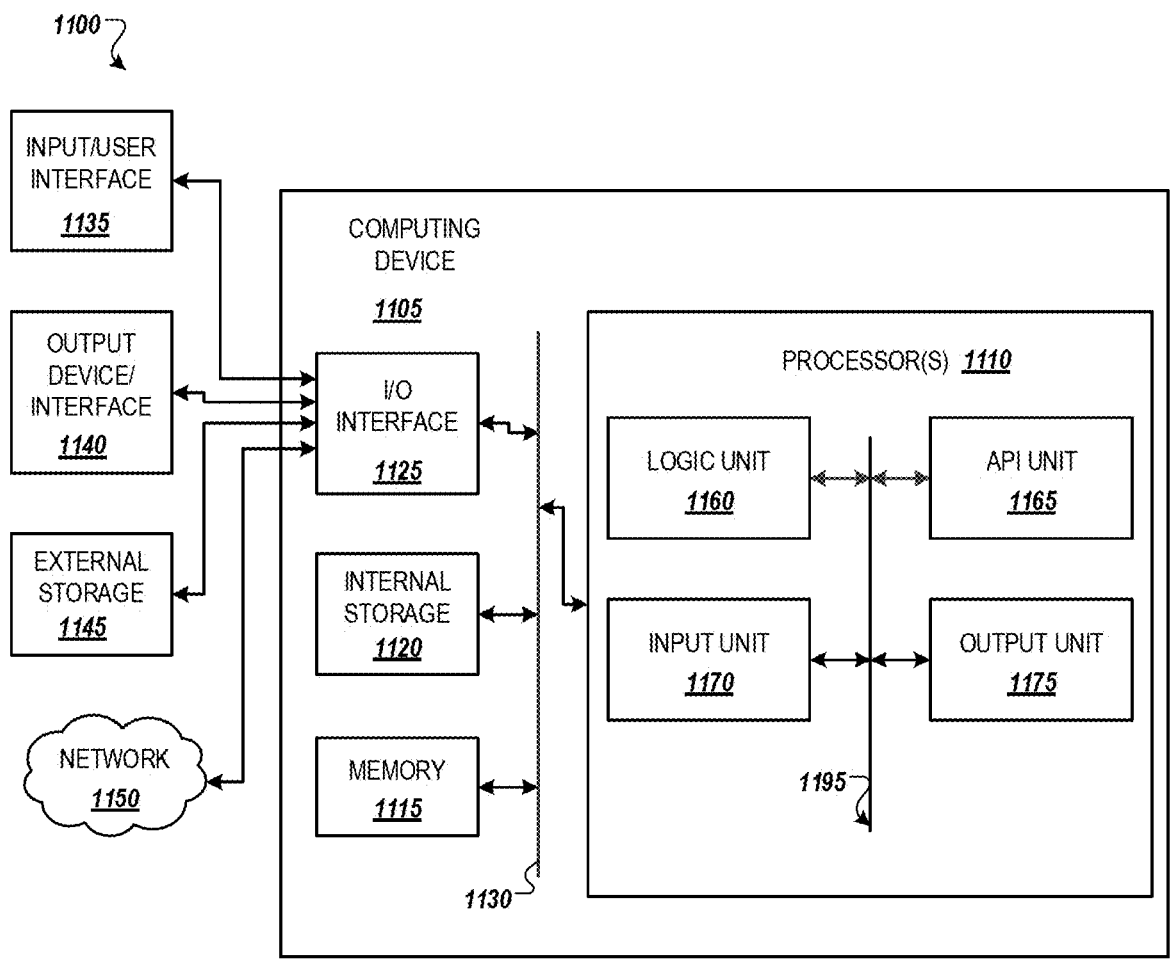
FIG. 11 illustrates an example computing environment with an example computing device suitable for use in some example implementations.

FIG. 11 illustrates an example computing environment with an example computing device suitable for use in some example implementations. Computing device 1105 in computing environment 1100 can include one or more processing units, cores, or processor(s) 1110, memory 1115 (e.g., RAM, ROM, and/or the like), internal storage 1120 (e.g., magnetic, optical, solid-state storage, and/or organic), and/or I/O interface 1125, any of which can be coupled on a communication mechanism or bus 1130 for communicating information or embedded in the computing device 1105. I/O interface 1125 is also configured to receive images from cameras or provide images to projectors or displays, depending on the desired implementation.

Computing device 1105 can be communicatively coupled to input/user interface 1135 and output device/interface 1140. Either one or both of the input/user interface 1135 and output device/interface 1140 can be a wired or wireless interface and can be detachable. Input/user interface 1135 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1140 may include a display, television, monitor, printer, speaker, braille, or the like. In some example implementations, input/user interface 1135 and output device/interface 1140 can be embedded with or physically coupled to the computing device 1105. In other example implementations, other computing devices may function as or provide the functions of input/user interface 1135 and output device/interface 1140 for a computing device 1105.

Examples of computing device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1105 can be communicatively coupled (e.g., via I/O interface 1125) to external storage 1145 and network 1150 for communicating with any number of networked components, devices, and systems, including one or more computing devices of the same or different configuration. Computing device 1105 or any connected computing device can be functioning as, providing services of, or referred to as, a server, client, thin server, general machine, special-purpose machine, or another label.

I/O interface 1125 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computing device 1105 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computing device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1110 can execute under any operating system (OS) (not shown), in a native or virtual environment. One or more applications can be deployed that include logic unit 1160, application programming interface (API) unit 1165, input unit 1170, output unit 1175, and inter-unit communication mechanism 1195 for the different units to communicate with each other, with the OS, and with other applications (not shown). The described units and elements can be varied in design, function, configuration, or implementation and are not limited to the descriptions provided. Processor(s) 1110 can be in the form of hardware processors such as central processing units (CPUs) or in a combination of hardware and software units.

In some example implementations, when information or an execution instruction is received by API unit 1165, it may be communicated to one or more other units (e.g., logic unit 1160, input unit 1170, output unit 1175). In some instances, logic unit 1160 may be configured to control the information flow among the units and direct the services provided by API unit 1165, the input unit 1170, and the output unit 1175 in some example implementations described above. For example, the flow of one or more processes or implementations may be controlled by logic unit 1160 alone or in conjunction with API unit 1165. The input unit 1170 may be configured to obtain input for the calculations described in the example implementations, and the output unit 1175 may be configured to provide an output based on the calculations described in example implementations.

Processor(s) 1110 can be configured to set an object display limit on a display map, the display map displaying a plurality of objects, and wherein each of the plurality of objects is assigned a priority status as illustrated in FIG. 10. The processor(s) 1110 may also be configured to receive data from the end device as illustrated in FIG. 10. The processor(s) 1110 may also be configured to classify the data and assigning priority status to an object with the data, wherein the object is added to the plurality of objects as illustrated in FIG. 10. The processor(s) 1110 may also be configured to display the plurality of objects based on priority status and the object display limit as illustrated in FIG. 10.

The processor(s) 1110 may also be configured to receive external data for processing as illustrated in FIGS. 1 and 10. The processor(s) 1110 may also be configured to classify the external data and assigning priority status to objects with the external data as illustrated in FIGS. 1 and 10. The processor(s) 1110 may also be configured to add the objects within the external data to the plurality of objects, wherein: the external data comprises feeder object data and external system data, and the data and the external data are collected at a predetermined collection period, the predetermined collection period is adjustable as illustrated in FIGS. 1 and 10.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to, optical disks, magnetic disks, read-only memories, random access memories, solid-state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored in the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for visualization of an end device, the method comprising:
   setting an object display limit on a display map, the display map displaying a plurality of objects, and wherein each of the plurality of objects is assigned a priority status;
   receiving data from the end device;
   classifying the data and assigning priority status to an object with the data, wherein the object is added to the plurality of objects; and
   displaying the plurality of objects based on priority status and the object display limit,
   wherein the displaying the plurality of objects comprises displaying a plurality of symbols representing the plurality of objects in at least one enclosure, and symbols within an enclosure represent objects that correspond to a communication gateway and at least one end device in communication with the communication gateway,
   wherein the displaying the plurality of objects further comprises:
      displaying a symbol under a first mode if associated communication gateway or end device has an online status;
      displaying a symbol under a second mode if associated communication gateway or end device has an offline status; and
      displaying a symbol under a third mode if associated communication gateway or end device has a warning status.

2. The method of claim 1, further comprising:
   receiving external data for processing;
   classifying the external data and assigning priority status to objects with the external data; and
   adding the objects within the external data to the plurality of objects, wherein:
   the external data comprises feeder object data, and external system data, and
   the data and the external data are collected at a predetermined collection period, the predetermined collection period is adjustable.

3. The method of claim 1, wherein the displaying the plurality of objects further comprises:
   displaying a symbol under a fourth mode if associated end device has an online status while providing ancillary service to a distribution system; and
   displaying a symbol under a fifth mode if associated end device has an online status but is unable to receive control command to change operation of the associated end device.

4. The method of claim 1, wherein the displaying the plurality of objects comprises displaying the plurality of symbols and at least one enclosure representing the plurality of objects, the plurality of symbols is displayed inside the at least one enclosure,
   wherein every enclosure represents an object that corresponds to a communication gateway, and every symbol within an enclosure represents an object that corresponds to an end device that is in communication with a communication gateway that corresponds to the enclosure.

5. The method of claim 4, wherein the displaying the plurality of objects further comprises:
   displaying a symbol or an enclosure under the first mode if associated communication gateway or end device has an online status;
   displaying a symbol or an enclosure under the second mode if associated communication gateway or end device has an offline status;
   displaying a symbol or an enclosure under the third mode if associated communication gateway or end device has a warning status;
   displaying a symbol under a fourth mode if associated end device has an online status while providing ancillary service to a distribution system; and
   displaying a symbol under a fifth mode if associated end device has an online status but is unable to receive control command to change operation of the associated end device.

6. The method of claim 1, wherein the end device comprises an inverter and at least one of a photovoltaic distributed generation (PV-DG), a battery energy storage, and an electric vehicle.

7. The method of claim 1, wherein the displaying the plurality of objects based on priority status and the object display limit comprises:
   if a number of the plurality of objects exceeds the object display limit, displaying the plurality of object up to the object display limit based on priority status; and
   if the number of the plurality of objects does not exceed the object display limit, displaying the plurality of objects,
   wherein the displaying the plurality of object up to the object display limit based on priority status comprises:
   for objects of the plurality of objects that are associated with feeder object data, displaying the objects from high priority objects to low priority objects according to assigned priority status, wherein assigned priority statuses for the objects of the plurality of objects associated with feeder object data are determined by a user.

8. The method of claim 7, wherein the displaying the plurality of object up to the object display limit based on priority status further comprises:
   for objects of the plurality of objects that are associated with communications gateways or end devices, displaying the objects from high priority objects to low priority objects according to assigned priority status, wherein assigned priority statuses for the objects of the plurality of objects associated with communications gateways or end devices are determined by the user.

9. The method of claim 8, wherein the displaying the plurality of object up to the object display limit based on priority status further comprises:
   for objects of the plurality of objects that are event markers, displaying the objects from high priority objects to low priority objects according to assigned priority status, wherein assigned priority statuses for the objects of the plurality of objects that are event markers are determined by the user.

10. A non-transitory computer readable medium, storing instructions for visualization of an end device, the instructions comprising:
    setting an object display limit on a display map, the display map displaying a plurality of objects, and wherein each of the plurality of objects is assigned a priority status;
    receiving data from the end device;
    classifying the data and assigning priority status to an object with the data, wherein the object is added to the plurality of objects; and
    displaying the plurality of objects based on priority status and the object display limit,
    wherein the displaying the plurality of objects comprises displaying a plurality of symbols representing the plurality of objects in at least one enclosure, and symbols within an enclosure represent objects that correspond to a communication gateway and at least one end device in communication with the communication gateway,
    wherein the displaying the plurality of objects further comprises:
    displaying a symbol under a first mode if associated communication gateway or end device has an online status;
    displaying a symbol under a second mode if associated communication gateway or end device has an offline status;
    displaying a symbol under a third mode if associated communication gateway or end device has a warning status;
    displaying a symbol under a fourth mode if associated end device has an online status while providing ancillary service to a distribution system; and
    displaying a symbol under a fifth mode if associated end device has an online status but is unable to receive control command to change operation of the associated end device.

11. The non-transitory computer readable medium of claim 10, further comprising:
    receiving external data for processing;
    classifying the external data and assigning priority status to objects with the external data; and
    adding the objects within the external data to the plurality of objects, wherein:

the external data comprises feeder object data, and external system data, and the data and the external data are collected at a predetermined collection period, the predetermined collection period is adjustable.

12. The non-transitory computer readable medium of claim 10, wherein the displaying the plurality of objects comprises displaying the plurality of symbols and at least one enclosure representing the plurality of objects, the plurality of symbols is displayed inside the at least one enclosure, wherein every enclosure represents an object that corresponds to a communication gateway, and every symbol within an enclosure represents an object that corresponds to an end device that is in communication with a communication gateway that corresponds to the enclosure.

13. The non-transitory computer readable medium of claim 12, wherein the displaying the plurality of objects further comprises:

displaying a symbol or an enclosure under the first mode if associated communication gateway or end device has an online status;

displaying a symbol or an enclosure under the second mode if associated communication gateway or end device has an offline status;

displaying a symbol or an enclosure under the third mode if associated communication gateway or end device has a warning status;

displaying a symbol under the fourth mode if associated end device has an online status while providing ancillary service to the distribution system; and displaying a symbol under the fifth mode if associated end device has an online status but is unable to receive control command to change operation of the associated end device.

14. The non-transitory computer readable medium of claim 10, wherein the displaying the plurality of objects based on priority status and the object display limit comprises:

if a number of the plurality of objects exceeds the object display limit, displaying the plurality of object up to the object display limit based on priority status; and if the number of the plurality of objects does not exceed the object display limit, displaying the plurality of objects, wherein the displaying the plurality of object up to the object display limit based on priority status comprises:

for objects of the plurality of objects that are associated with feeder object data, displaying the objects from high priority objects to low priority objects according to assigned priority status, wherein assigned priority statuses for the objects of the plurality of objects associated with feeder object data are determined by a user.

15. The non-transitory computer readable medium of claim 14, wherein the displaying the plurality of object up to the object display limit based on priority status further comprises:

for objects of the plurality of objects that are associated with communications gateways or end devices, displaying the objects from high priority objects to low priority objects according to assigned priority status, wherein assigned priority statuses for the objects of the plurality of objects associated with communications gateways or end devices are determined by the user.

16. The non-transitory computer readable medium of claim 15, wherein the displaying the plurality of object up to the object display limit based on priority status further comprises:

for objects of the plurality of objects that are event markers, displaying the objects from high priority objects to low priority objects according to assigned priority status, wherein assigned priority statuses for the objects of the plurality of objects that are event markers are determined by the user.

* * * * *